United States Patent [19]
Moore et al.

[11] Patent Number: 6,010,114
[45] Date of Patent: Jan. 4, 2000

[54] DAMPER SYSTEM WITH INTERNAL SEALING CHANNELS AND METHOD OF ASSEMBLY

[75] Inventors: John B. Moore, Underhill Center; Wayne E. Goldman, Morrisville, both of Vt.

[73] Assignee: Fab-Tech Inc., Colchester, Vt.

[21] Appl. No.: 08/779,863

[22] Filed: Jan. 3, 1997

[51] Int. Cl.[7] ............................................. F16K 1/22
[52] U.S. Cl. ............................................. 251/306; 251/307
[58] Field of Search ....................................... 251/306, 307

[56]        References Cited
         U.S. PATENT DOCUMENTS 2,946,554   7/1960   Asker et al. ......................... 251/306
4,164,236   8/1979   Owen et al. ........................ 251/306 X
5,494,257   2/1996   Maxwell ............................... 251/307

*Primary Examiner*—John Fox
*Attorney, Agent, or Firm*—Richard J. Birch

[57]            ABSTRACT

A damper system has a rotatable, damper blade pivotally mounted within a damper body. The inner wall of the damper body has a plurality of inwardly, radially extending pins over which is fitted a generally U-shaped sealing channel. The sealing channel comprises two members each of which is held in compression against the inner wall of the damper body by adjustable hold-down blocks.

9 Claims, 5 Drawing Sheets

DAMPER SYSTEM WITH INTERNAL SEALING CHANNELS AND METHOD OF ASSEMBLY

BACKGROUND OF THE INVENTION

1. Field of the Invention.

The present invention relates to damper systems in general, and more particularly, to a damper system and method of assembly which employs an edge sealed damper blade.

2. Background Information.

Damper systems for controlling fluid flow are well known in the art. These damper systems are often used under deleterious environmental conditions. Fume exhaust systems can be required to handle highly corrosive and toxic fumes. Dampers in such exhaust systems must be able to withstand such environmental conditions. The damper system components typically are coated with a protective coating, such as, a fluropolymer.

U.S. patent application Ser. No. 08/633,962, filed Apr. 19, 1996, by Wayne E. Goldman for "DAMPER SYSTEM AND METHOD OF ASSEMBLY", which is incorporated herein by reference, discloses a mounting system for the damper blade with all of the components being resistive to the fluids, generally gases, controlled by the damper system.

The operational effectiveness of the damper system in the closed position depends upon the tightness of the damper blade seal with respect to the damper body. In addition, the damper blade-damper body sealing surfaces should be resistant to the fluids controlled by the damper system.

SUMMARY OF THE INVENTION

A damper system and method has a rotatable damper blade pivotally mounted within a damper body. The damper blade edge seals against a generally U-shaped damper body sealing channel held in compression against the inner wall of the damper body by adjustable hold-down blocks. Preferably, the damper body sealing channel is formed from a fluropolymer.

DESCRIPTION OF A PREFERRED EMBODIMENT

Figure 1:
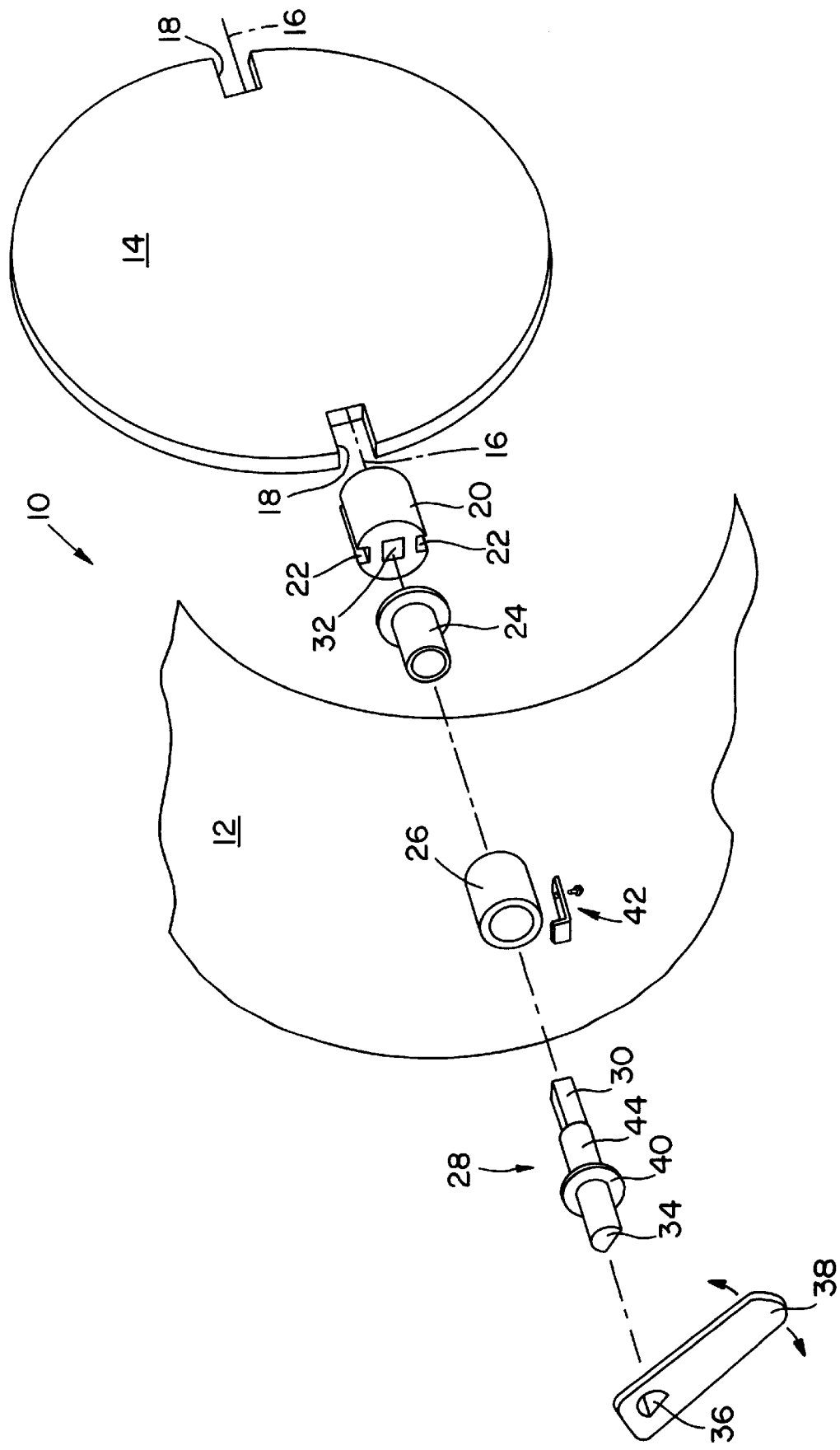
FIG. 1 is an exploded view of a damper system and duplicates the Single Figure of the above-mentioned patent application.

Turning now to FIG. 1, which duplicates the Single Figure of the above-mentioned patent application, there is shown in exploded, perspective view a damper assembly indicated generally by the reference numeral 10. The damper assembly 10 comprises a hollow damper body 12, a portion of which is illustrated in FIG. 1, and a rotationally mounted damper blade 14. The rotational axis 16 extends through opposed notches 18 that extend inwardly from the periphery of damper blade 14. A female socket 20 having opposed channels 22 is slid into the notch 18 with channels 22 fitted over the damper blade 14 so that the socket is held in the notch.

Flange bearing 24 extends into a bushing 26 that is mounted on the damper body 12. A shaft, indicated generally by the reference numeral 28, has a keyed end 30 that fits within bore 32 of the female socket 20. The other end 34 of shaft 28 is also keyed to fit within a "D-slot" 36 formed in an actuator arm 38. Shaft 28 includes a shaft retainer washer 40 that is held by a shaft retainer assembly 42. This configuration prevents movement of shaft 28 along the rotational axis 16 of the damper blade 14 while permitting the actuator arm 38 to rotate shaft 28 and thereby damper blade 14. The damper blade itself can be either circular or elliptical with the latter being preferred.

It will be appreciated that for purposes of simplicity, the corresponding female socket 20, flange bearing 24, bushing 26, shaft 28, washer 40 and shaft retainer assembly 42 for the right hand portion of the drawing have been omitted.

The damper blade 14 and shaft 28 at portion 44 can be coated with a suitable material, such as a fluropolymer, e.g., TEFLON, to resist the negative effects of fluids passing through the damper assembly. The female socket 20 can be constructed from resistive materials such as, a glass reinforced fluropolymer e.g., TEFLON or TEFZEL or from a ceramic.

If coating is desired, coating of the damper assembly is performed before the components are assembled together. The "slide on" female sockets are inserted into the corresponding notches before positioning the damper blade in the damper body. Subsequent assembly of the parts follows the exploded view of FIG. 1.

Figure 2:
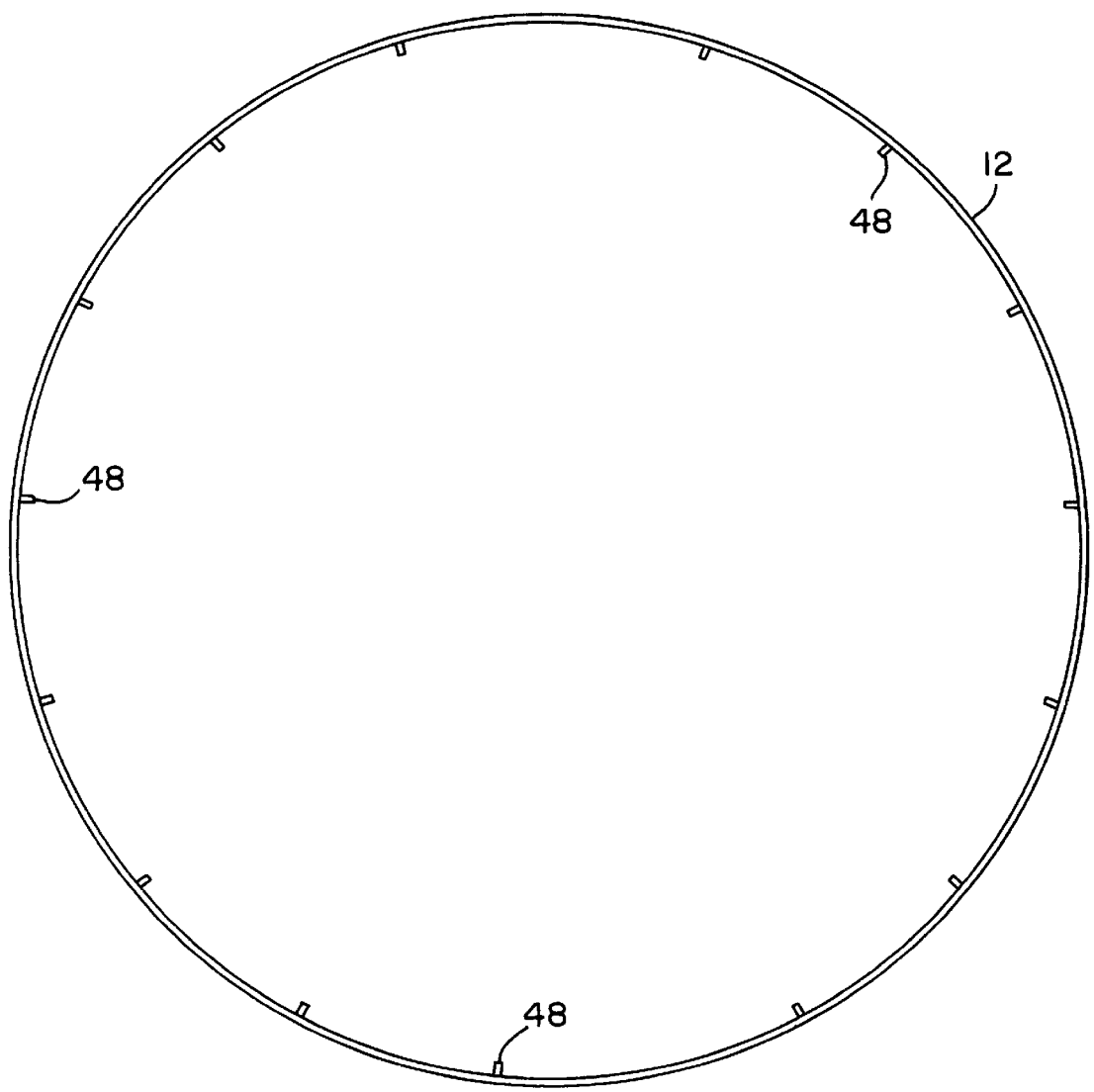
FIG. 2 is a sectional view of the damper body and the inwardly extending channel engaging pins secured with respect to the inner wall of the damper body.
Figure 3:
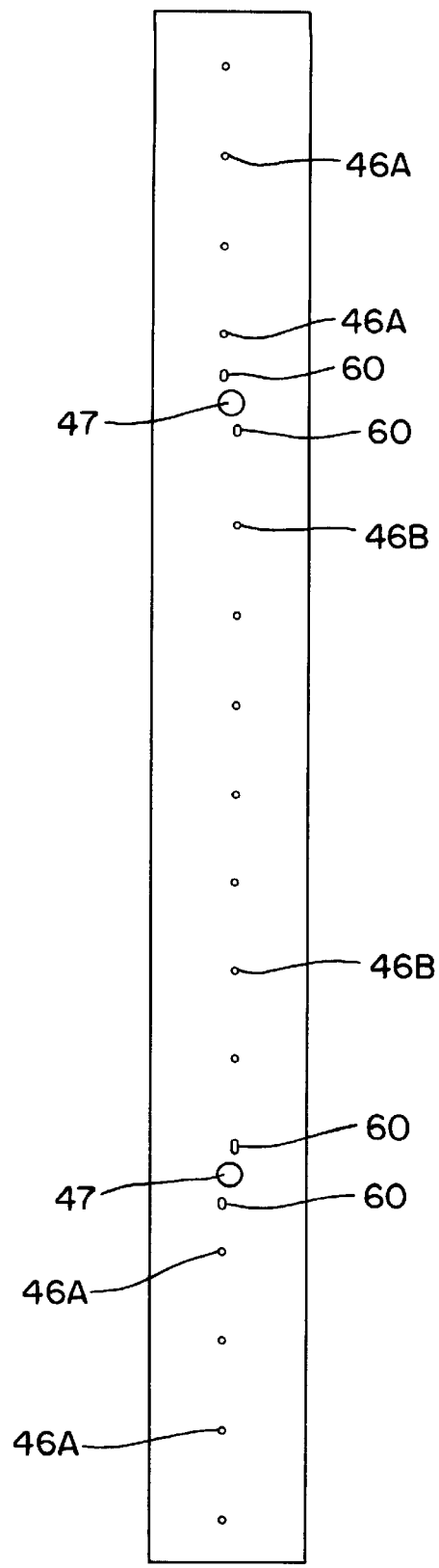
FIG. 3 is a view of a portion of the damper body that has been flattened out and shows the holes for the pins illustrated in FIG. 2.
Figure 4:
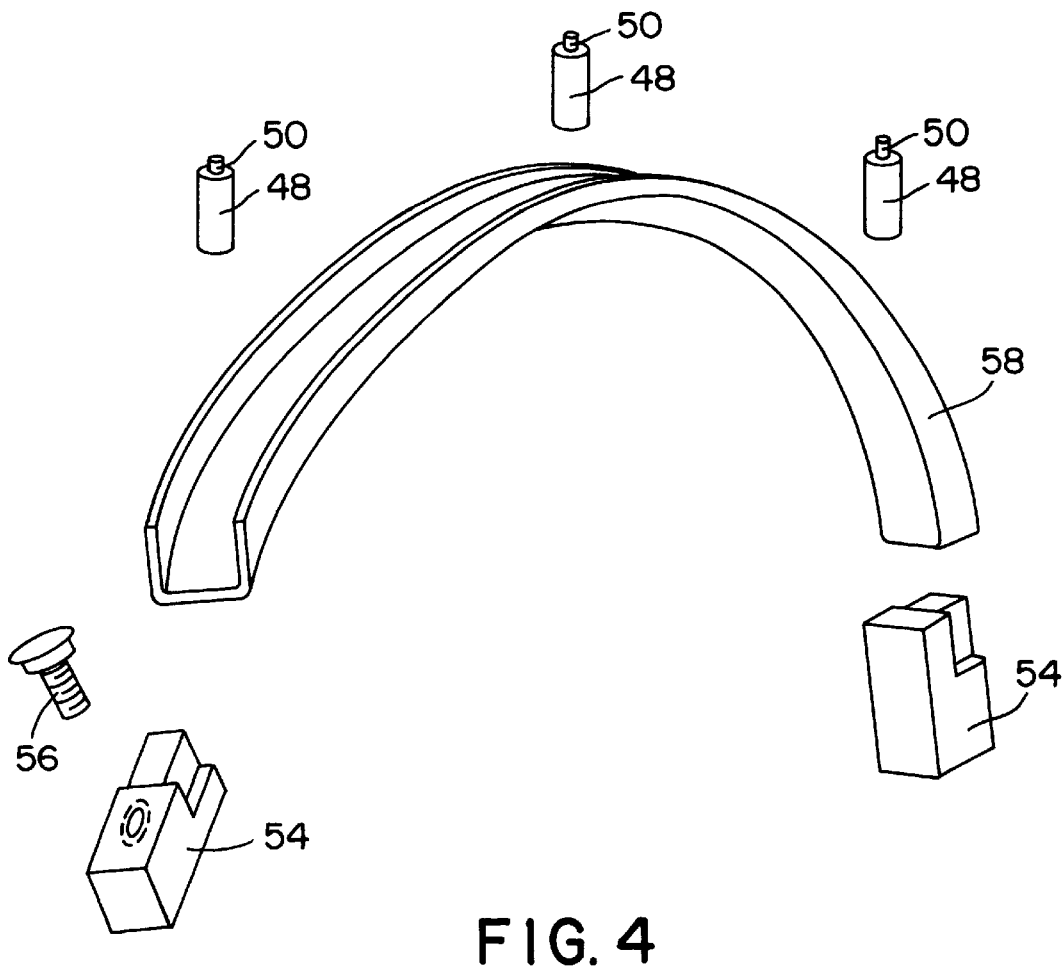
FIG. 4 is an exploded view depicting the pins, one section of the generally U-shaped sealing channel and the adjustable hold-down blocks.

FIG. 2 and 3 illustrate the damper body in cross-section in FIG. 2 and a portion of the damper body rolled out to be presented as a flat element in FIG. 3. The damper body portion shown in FIG. 3 has a plurality of holes 46A and 46B formed therein and apertures 47. Apertures 47 accommodate bushings 26 shown in FIG. 1. The holes 46A and 46B are employed to hold pins 48 as best seen in FIG. 4. The pins 48 are preferably formed from stainless steel and have a reduced diameter shoulder portion 50 that fits within the holes 46A and 48B for subsequent welding to produce the assembly shown in FIG. 2. It should be noted that holes 46A are offset from the holes identified as 46B in FIG. 3. After the reduced diameter portions 50 of the pins are inserted into the holes 46A and 48B and welded to the damper body 12, it will be appreciated that if the flat illustrated damper body 12 were then rolled and secured with end portions 52A and 52B being joined together, the resulting configuration will be that depicted in FIG. 2.

Figure 5:
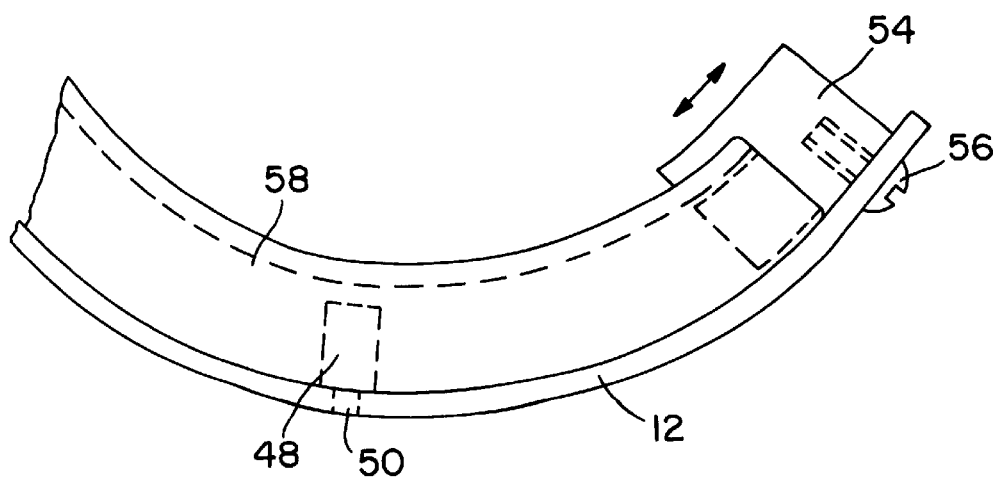
FIG. 5 is a partial view in side elevation showing the sealing channel abutting the inner wall of the damper body, and one adjustable hold-down block; and, FIG. 6 is an enlarged view illustrating the sealing contact between the damper blade edge seal and the sealing channel of the damper body.

With the pins 48 secured to the inner surface of damper body 12 as shown in FIG. 2, hold-down blocks 54 are secured to the damper body as shown in FIGS. 4 and 5. The hold-down blocks 54 are secured by means of a fastener 56 and at least one of the hold-down blocks 54 can be adjusted as depicted by the double ended arrow in FIG. 5. This adjustment is achieved by providing slots 60 in the damper body as shown in FIG. 3. The hold-down blocks accept a damper body channel seal member 58 having a generally U-shaped cross section. The channel seal member 58 preferably is extruded from a fluropolymer such as TEFLON, although other corrosion resistant materials can be employed. By adjusting the position of one or both of the hold-down blocks 54, the channel seal member 58 can be placed in compression and held tightly against the inner wall of the damper body.

It will be appreciated that while only one such channel seal member is depicted in FIGS. 4 and 5, a corresponding channel seal member and hold-down blocks are employed to provide a complete sealing surface within the damper body 12.

Figure 6:
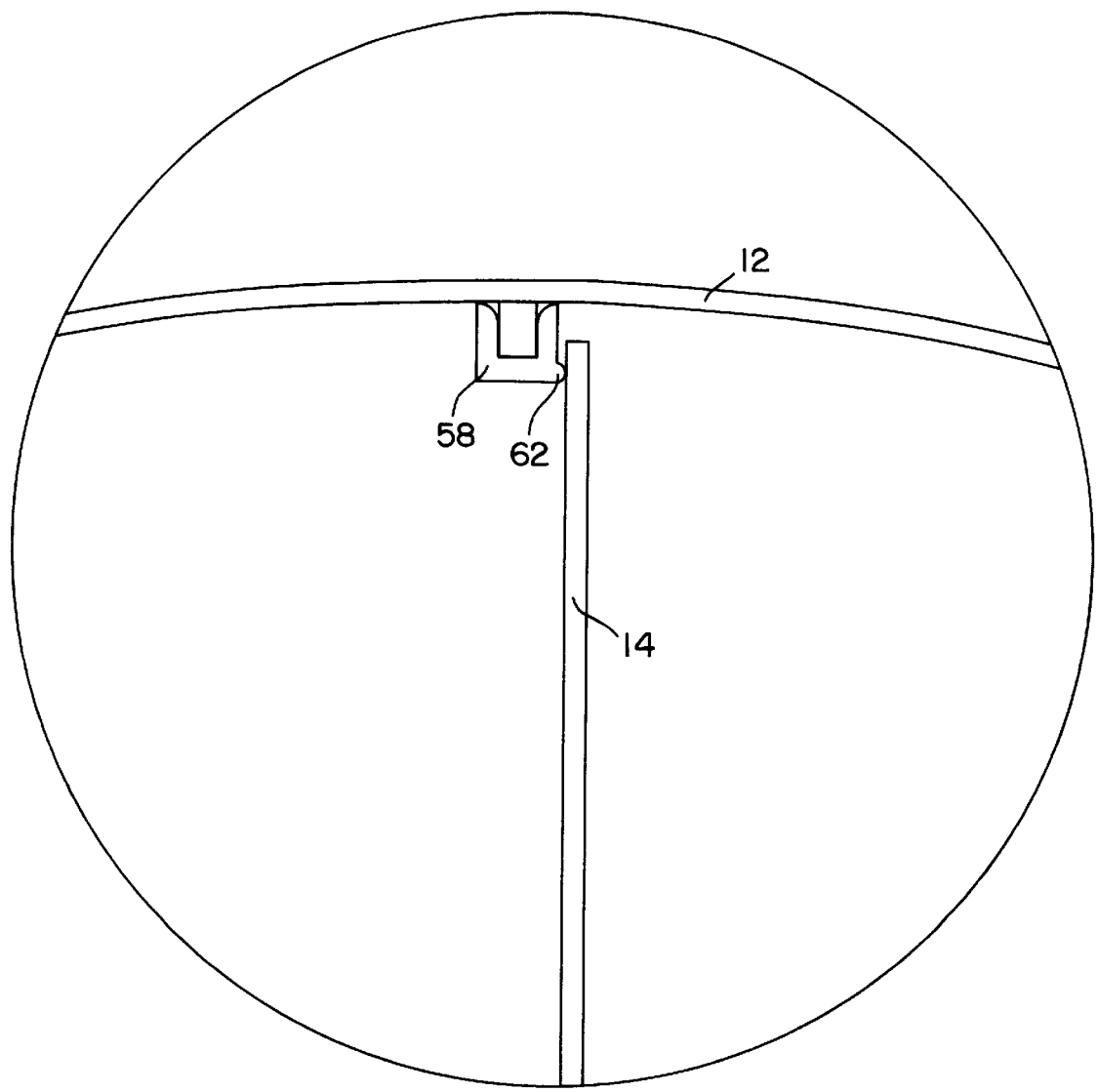

FIG. 6 illustrates, in enlarged form, the sealing between the damper blade 14 and the damper body channel seal 58. Preferably, the channel seal 58 has a protruding curvilinear element 62 which provides for the actual sealing contact between the damper blade 14 and the damper body channel seal 58. Again, it will be appreciated that only half of the damper blade and damper body channel seal 58 have been depicted in FIG. 6.

Having described in detail a preferred embodiment of our invention, it will now be obvious to those having ordinary skill in the art that numerous modifications can be made therein without departing from the scope of the invention as defined in the following claims.

What we claim and desire to protect by Letters Patent in the United States is:

1. A damper system comprising:

a damper body having a longitudinal axis and an inside wall of circular cross-section with a first channel seal member positioned against one arcuate portion of the inside wall and with a second channel seal member positioned against another arcuate portion of the inside wall of the damper body with said arcuate portions defining two planes that intersect the damper body longitudinal axis at spaced apart locations, said first and second channel seal member have a generally U-shaped cross-sectional configuration and further comprising a plurality of radially, inwardly extending pine mounted on each of said inner wall arcuate portions and with said first and second channel seal members positioned with the pins located within the U-shaped cross sectional configuration; and, a damper blade pivotally mounted within said damper body.

2. The damper system of claim 1 further comprising first and second first channel seal member hold-down blocks mounted on the inside wall of the damper body at each end of said one arcuate portion of the inside wall and third and fourth second channel seal member hold-down blocks mounted at each end of said another arcuate portion of the inside wall of the damper body.

3. The damper system of claim 2 wherein the mounting position of said first and third hold-down blocks is adjustable in a plane normal to said damper body longitudinal axis.

4. The damper system of claim 3 wherein said first and third channel seal member hold-down blocks are mounted in a position to place the corresponding first and second channel seal members in compression.

5. The damper system of claim 1 wherein said damper blade is circular.

6. The damper system of claim 1 wherein said damper blade is elliptical.

7. The damper system of claim 1 wherein said first and second channel seal members are formed from a fluropolymer.

8. The damper system of claim 1 wherein said first and second channel seal members are formed from a corrosion resistant material.

9. The damper system of claim 1 wherein each of said first and second channel seal members has a damper blade contacting curvelinear sealing portion.

\* \* \* \* \*